Patented Sept. 2, 1952

2,609,372

UNITED STATES PATENT OFFICE 2,609,372

HALOGENATION OF 2-AMINOPYRIMIDINES

Carl Ziegler, Clementon, N. J., assignor to Sharp & Dohme, Incorporated, Philadelphia, Pa., a corporation of Maryland No Drawing. Application May 5, 1950, Serial No. 160,385

5 Claims. (Cl. 260—256.4)

This invention is concerned with an improved process for the halogenation of 2-aminopyrimidines. It is more specifically concerned with an improved process for the chlorination or bromination of 2-aminopyrimidines.

It has been discovered as a feature of this invention that the halogenation of 2-aminopyrimidines is advantageously accomplished by conducting the halogenation in the presence of a carbonate, oxide, or phosphate of a metal occurring in group 2a of the periodic system. More particularly, the substances which have proved especially advantageous in this improved process are barium, calcium and magnesium carbonates and oxides. Because of the economic factors calcium carbonate is the material of choice.

Heretofore the halogenation of 2-aminopyrimidines to produce 2-amino-5-halogenopyrimidines has been accomplished by direct halogenation of the corresponding 2-aminopyrimidines in an aqueous solution at elevated temperature or by direct halogenation in aqueous acidic solution at room temperature.

It has been discovered as a feature of this invention that the yield of 5-halogeno-product is increased markedly, over the yields obtained by the presently known methods of halogenating 2-aminopyrimidines, by conducting the halogenation in the presence of a carbonate, oxide, or phosphate of a metal occurring in group 2a of the periodic system.

Presently, the halogenation of 2-aminopyrimidines ordinarily is accomplished by dissolving the desired 2-aminopyrimidine in warm water and adding thereto with stirring the halogenating agent, for example, bromine or chlorine. The improvement of this invention resides in adding to the aqueous solution of the pyrimidine a carbonate, oxide, or phosphate of a metal occurring in group 2a of the periodic system. The halogenating agent is then added to the mixture in the usual manner and there results 2-amino-5-halogenopyrimidine in yields markedly higher than obtained by presently known methods.

It has been found advantageous to use at least one equivalent of the carbonate, oxide or phosphate for each equivalent of the 2-aminopyrimidine being halogenated. Of course, it is possible to obtain the advantage of this invention by using quantities of the carbonate, oxide, or phosphate in excess of one equivalent for each equivalent of the aminopyrimidine being halogenated, but this excess material must be separated from the reaction product at the end of the reaction.

The invention is illustrated by, but not restricted to, the following examples:

Example 1—Bromination of 2-aminopyrimidine in the presence of calcium carbonate.—One-half mole (47.5 g.) of 2-aminopyrimidine was dissolved in 500 ml. of water at 55° C. To this was added 25 g. (0.25 mole) of calcium carbonate. Bromine (88 g.; 0.55 mole) was added over a period of approximately ½ hour while the solution was stirred vigorously. The solution was stirred for an additional ½ hour at which time the calcium carbonate had dissolved. The solution was then made basic with excess ammonium hydroxide. The crude product was filtered and recrystallized from alcohol. The yield was 66.5 g. (76%) of 2-amino-5-bromopyrimidine, M. P. 235-7° C. (uncorrected).

The above procedure was repeated with the exception that calcium carbonate was not added to the reaction mixture. There was obtained a 40% yield of 2-amino-5-bromopyrimidine.

Example 2—Chlorination of 2-aminopyrimidine in the presence of calcium carbonate.—71.3 g. (.73 mole) of 2-aminopyrimidine was dissolved in 500 ml. of water at 60° C. There was added 42 g. (.42 mole) of calcium carbonate and chlorine was passed into the solution, which was being stirred continuously, until the calcium carbonate dissolved. The solution was then made strongly basic with ammonium hydroxide producing a precipitate which was filtered. The precipitate was reprecipitated from an ammonical solution yielding 59.2 g. (60%) of 2-amino-5-chloropyrimidine, M. P. 227-9° C. (uncorrected).

The above procedure was repeated except that the calcium carbonate was not added to the reaction mixture. There was obtained a 35% yield of 2-amino-5-chloropyrimidine.

Example 3—Bromination of 2-amino-4-methylpyrimidine in the presence of calcium carbonate.—32.7 g. (0.3 mole) of 2-amino-4-methylpyrimidine was dissolved in 300 ml. of water at 55° C. There was added 15 g. (0.15 mole) of calcium carbonate. To this was added dropwise 52.8 g. (0.33 mole) of bromine with constant, vigorous agitation. After the bromine was added, the mixture was stirred for approximately ½ hour longer at which time the calcium carbonate was dissolved. Stirring was stopped and the solution made alkaline by the addition of concentrated ammonium hydroxide, producing a precipitate. This precipitate was separated from the solution by filtration and was recrystallized with alcohol. There was obtained 41.2 g. (73%) of 2-amino-5-bromo-4-methylpyrimidine, M. P. 192-4° C. (uncorrected) (dec.).

The above procedure was repeated with the exception that calcium carbonate was not added. There was obtained a 40% yield of 2-amino-5-bromo-4-methylpyrimidine.

Example 4—Chlorination of 2-amino-4-methylpyrimidine in the presence of calcium carbonate.—54.5 g. (0.5 mole) of 2-amino-4-methylpyrimidine was dissolved in 500 ml. water at approximately 55° C. To this was added 27.5 g. (0.275 mole) of calcium carbonate and the mixture stirred. Chlorine was then passed into the solution until all of the calcium carbonate dissolved. The solution was then stirred for approximately ½ hour at which time stirring stopped and the solution made alkaline by the addition of concentrated ammonium hydroxide. The precipitate which resulted was separated by filtration and recrystallized from alcohol. There was obtained 50.8 g. (70%) of 2-amino-5-chloro-4-methylpyrimidine, M. P. 189–191° C. (uncorrected).

The above procedure was repeated with the exception that no calcium carbonate was added to the reaction mixture. There was obtained a 34% yield of 2-amino-5-chloro-4-methylpyrimidine.

*Example 5—Bromination of 2-amino-4-methylpyrimidine in the presence of magnesium oxide.*—16.3 g. (0.15 mole) of 2-amino-4-methylpyrimidine was dissolved in 125 ml. water (50° C.). There was added 3.39 g. (0.08 mole) magnesium oxide and the mixture stirred. 26.4 g. of bromine was added dropwise to the mixture and the stirring continued for approximately ½ hour thereafter at which time the calcium oxide was all in solution. The solution was then made alkaline with concentrated ammonium hydroxide and the resulting precipitate separated therefrom by filtration. The precipitate was recrystallized from alcohol and there was obtained 20.2 g. (71%) of 2-amino-5-bromo-4-methylpyrimidine, M. P. 191–193° C. (uncorrected).

This yield is comparable to the 40% yield obtained as in the last paragraph of Example 3.

*Example 6—Bromination of 2-amino-4-methylpyrimidine in the presence of barium carbonate.*—Example 5 was repeated except that in place of the magnesium oxide there used there was here used 16.3 g. (0.08 mole) barium carbonate. There was obtained a 73% yield of 2-amino-5-bromo-4-methylpyrimidine.

*Example 7—Bromination of 2-amino-4-methylpyrimidine in the presence of magnesium carbonate.*—Example 5 was repeated except that for the magnesium oxide there used there was here substituted 9.0 g. (0.08 mole) magnesium carbonate. There was obtained a 71% yield of 2-amino-5-bromo-4-methylpyrimidine.

*Example 8—Bromination of 2-amino-4-methylpyrimidine in the presence of calcium phosphate.*—Example 5 was repeated except that for the magnesium oxide there used there was here substituted 23.3 g. (0.11 mole) of calcium phosphate. There was obtained a 67% yield of 2-amino-5-bromo-4-methylpyrimidine.

*Example 9—Chlorination of 2-amino-4,6-dimethylpyrimidine in the presence of calcium carbonate.*—61.5 g. (0.5 mole) 2-amino-4,6-dimethylpyrimidine was dissolved in approximately 500 ml. water at approximately 70–75° C. There was added 30 g. (0.3 mole) calcium carbonate, and the mixture stirred. Chlorine was passed into the reaction mixture until all of the calcium carbonate was dissolved and stirring was continued for approximately ½ hour thereafter. The stirring was stopped and the solution was made alkaline with concentrated ammonium hydroxide. The crude product which was precipitated was separated by filtration and immediately recrystallized from 50% aqueous alcohol. There was obtained 53 g. (74%) of 2-amino-5-chloro-4,6-dimethylpyrimidine, M. P. 181–3° C. (uncorrected).

The above procedure was repeated except that calcium carbonate was not added to the reaction mixture. There was obtained a 45% yield of 2-amino-5-chloro-4,6-dimethylpyrimidine.

The advantage of this invention is strikingly illustrated by a tabulation of the yields obtained in the above examples as compared to those obtained in halogenations without the use of an agent of this invention. In every instance more than 60% greater yield of desired product is obtained and, as seen below, the yields are in general improved by approximately 80%. In one instance the yield is improved by 106%. The economic advantage of these increased yields is patent.

*Table I*

| Example No. | Percent Yield without Invention Agent | Percent Yield with Invention Agent | Percent Increased (based on yield without invention agent) |
|---|---|---|---|
| 1 | 40 | 76 | 90 |
| 2 | 35 | 60 | 71 |
| 3 | 40 | 73 | 83 |
| 4 | 34 | 70 | 106 |
| 5 | 40 | 71 | 78 |
| 6 | 40 | 73 | 83 |
| 7 | 40 | 71 | 78 |
| 8 | 40 | 67 | 68 |
| 9 | 45 | 76 | 64 |

What is claimed is:

1. The process for the preparation of 2-amino-5-halogenopyrimidines in which the halogeno-substituent is chosen from the class consisting of chlorine and bromine comprising halogenating a 2-aminopyrimidine in the presence of an agent selected from the group consisting of the carbonates, oxides and phosphates of metals chosen from the group consisting of calcium, barium and magnesium.

2. The process for the preparation of 2-amino-5-halogenopyrimidines in which the halogeno-substituent is chosen from the class consisting of chlorine and bromine comprising halogenating the appropriate 2-aminopyrimidine in the presence of calcium carbonate.

3. The process for the preparation of 2-amino-5-halogenopyrimidines in which the halogeno-substituent is chosen from the class consisting of chlorine and bromine comprising halogenating a 2-aminopyrimidine in the presence of an amount of calcium carbonate equivalent to the amount of aminopyrimidine used.

4. The process for the preparation of 2-amino-5-chloropyrimidines comprising chlorinating a 2-aminopyrimidine in the presence of an agent selected from the group consisting of the carbonates, oxides and phosphates of metals chosen from the group consisting of calcium, barium and magnesium.

5. The process for the preparation of 2-amino-5-bromopyrimidines comprising brominating a 2-aminopyrimidine in the presence of an agent selected from the group consisting of the carbonates, oxides and phosphates of metals chosen from the group consisting of calcium, barium and magnesium.

CARL ZIEGLER.

REFERENCES CITED

The following references are of record in the file of this patent:

UNITED STATES PATENTS

| Number | Name | Date |
|---|---|---|
| 2,521,544 | Shepherd | Sept. 5, 1950 |

OTHER REFERENCES

Johnson et al., Chem. Rev. 13, pp. 227–228 (1933).

Price et al., J. Org. Chem. 10, pp. 322–332 (1945).